(12) United States Patent
Budagavi (10) Patent No.: US 10,142,630 B2
(45) Date of Patent: Nov. 27, 2018

(54) MODE ADAPTIVE INTRA PREDICTION SMOOTHING IN VIDEO CODING

(75) Inventor: Madhukar Budagavi, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 661 days.

(21) Appl. No.: 13/316,182

(22) Filed: Dec. 9, 2011

(65) Prior Publication Data

US 2012/0147955 A1   Jun. 14, 2012

Related U.S. Application Data

(60) Provisional application No. 61/422,011, filed on Dec. 10, 2010.

(51) Int. Cl.
| | |
|---|---|
| H04N 19/117 | (2014.01) |
| H04N 19/159 | (2014.01) |
| H04N 19/593 | (2014.01) |
| H04N 19/46 | (2014.01) |

(52) U.S. Cl.
CPC ......... *H04N 19/117* (2014.11); *H04N 19/159* (2014.11); *H04N 19/593* (2014.11); *H04N 19/46* (2014.11)

(58) Field of Classification Search
CPC .. H04N 19/159; H04N 19/593; H04N 19/117; H04N 19/46
See application file for complete search history.

(56) References Cited

U.S. PATENT DOCUMENTS

| | | | | |
|---|---|---|---|---|
| 7,289,562 | B2 * | 10/2007 | Yan et al. | 375/240.03 |
| 8,576,906 | B2 * | 11/2013 | Andersson et al. | 375/240.03 |
| 2005/0002646 | A1 * | 1/2005 | Sato | 386/68 |
| 2005/0025236 | A1 * | 2/2005 | Yan et al. | 375/240.03 |
| 2005/0168644 | A1 * | 8/2005 | Demas et al. | 348/630 |
| 2006/0072676 | A1 * | 4/2006 | Gomila | H04N 19/61 375/240.27 |
| 2007/0025448 | A1 * | 2/2007 | Cha et al. | 375/240.24 |
| 2007/0171969 | A1 * | 7/2007 | Han et al. | 375/240.1 |
| 2009/0310677 | A1 * | 12/2009 | Shiodera et al. | 375/240.15 |
| 2011/0038415 | A1 * | 2/2011 | Min | H04N 19/00763 375/240.12 |

(Continued)

OTHER PUBLICATIONS

O. Le Meur, "Video Compression Beyond H.264, HEVC", University of Rennes 1, available at http://www.irisa.fr/temics/staff/lemeur/teaching/HEVC_CAV_ESIR3_2011_2012.pdf, Nov. 7, 2011, pp. 1-65.

(Continued)

*Primary Examiner* — Mohammed Jebari
(74) *Attorney, Agent, or Firm* — Gregory J. Albin; Charles A. Brill; Frank D. Cimino (57) ABSTRACT

A method for decoding an encoded video bit stream in a video decoder is provided that includes decoding an intra prediction mode for a block of pixels encoded in the video bit stream, determining, based on the intra prediction mode, whether or not a smoothing filter is to be applied to reference pixel values used for intra prediction of the block, applying a smoothing filter to the reference pixel values when a result of the determining is that a smoothing filter is to be applied, and performing intra prediction according to the intra prediction mode using the smoothed reference pixel values to generate a predicted block of pixels.

3 Claims, 7 Drawing Sheets

(56) References Cited

U.S. PATENT DOCUMENTS

2011/0280304 A1    11/2011    Jeon et al.
2012/0082224 A1*    4/2012    Van Der Auwera et al. ............... 375/240.12

OTHER PUBLICATIONS

Yu Liu, "Analysis of Coding Tools in HEVC Test Model (HM1.0)—Intra Prediction", Dec. 1, 2010, available at http://www.h265.net/2010/12/analysis-of-coding-tools-in-hevc-test-model-hm-intra-prediction.html on Nov. 29, 2011, pp. 1-4.

Madhukar Budagavi, "Angular Intra Prediction and ADI Simplification", JCTVC-B118, Jul. 21-28, 2010, pp. 1-4, Joint Collaborative Team on Video Coding (JCT-VC) of ITU-T SG16 WP3 and ISO/IEC JTC1/SC29/WG11, Geneva, Switzerland.

Jung-Hye Min et al, "Unification of the Directional Intra Prediction Methods in TMuC", JCTVC-B100, Jul. 21-28, 2010, pp. 1-3, Joint Collaborative Team on Video Coding (JCT-VC) of ITU-T SG16 WP3 and ISO/IEC JTC1/SC29/WG11, Geneva, Switzerland.

Frank Bossen et al, "Simplified Angular Intra Prediction", JCTVC-B093, Jul. 21-28, 2010, pp. 1-3, Joint Collaborative Team on Video Coding (JCT-VC) of ITU-T SG16 WP3 and ISO/IEC JTC1/SC29/WG11, Geneva, Switzerland.

Kemal Ugar et al, "Description of Video Coding Technology Proposal by Tandberg, Nokia, Ericsson", JCTVC-A119, Apr. 15-23, 2010, pp. 1-33, Joint Collaborative Team on Video Coding (JCT-VC) of ITU-T SG16 WP3 and ISO/IEC JTC1/SC29/WG11, Dresden, Germany.

Martin Winken et al, "Description of Video Coding Technology Proposal by Fraunhofer HHI", JCTVC-A116, Apr. 15-23, 2010, pp. 1-44, Joint Collaborative Team on Video Coding (JCT-VC) of ITU-T SG16 WP3 and ISO/IEC JTC1/SC29/WG11, Dresden, Germany.

Madhukar Budagavi, "Improved AIS Filter", JCTVC-D171, Jan. 20-28, 2011, pp. 1-3, Joint Collaborative Team on Video Coding (JCT-VC) of ITU-T SG16 WP3 and ISO/IEC JTC1/SC29/WG11, Daegu, Korea.

Yunfei Zheng et al, "Simplified Intra Smoothing", JCTVC-C234, Oct. 7-15, 2010, pp. 1-5, Joint Collaborative Team on Video Coding (JCT-VC) of ITU-T SG16 WP3 and ISO/IEC JTC1/SC29/WG11, Guangzhou, China.

Madhukar Budagavi, "TE5: TI Evaluation of Unified Intra Prediction Simplifications", JCTVC-0061, Oct. 7-15, 2010, pp. 1-6, Joint Collaborative Team on Video Coding (JCT-VC) of ITU-T SG16 WP3 and ISO/IEC JTC1/SC29/WG11, Guangzhou, China.

TK Tan et al, "Tool Experiment 5: Simplification of United Intra Prediction", JCTVC-B305_r1, Jul. 21-28, 2010, pp. 1-3, Joint Collaborative Team on Video Coding (JCT-VC) of ITU-T SG16 WP3 and ISO/IEC JTC1/SC29/WG11, Geneva, Switzerland.

TK Tan et al, "Summary Report for TE5 on Simplification of Unified Intra Prediction", JCTVC-0046, Oct. 7-15, 2010, pp. 1-5, Joint Collaborative Team on Video Coding (JCT-VC) of ITU-T SG16 WP3 and ISO/IEC JTC1/SC29/WG11, Guangzhou, China.

TK Tan and Frank Bossen, "TE5: Results for Simplification of Unified Intra Prediction", JCTVC-0042, Oct. 7-15, 2010, pp. 1-4, Joint Collaborative Team on Video Coding (JCT-VC) of ITU-T SG16 WP3 and ISO/IEC JTC1/SC29/WG11, Guangzhou, China.

"Test Model under Consideration" JCTVC-B205, Jul. 21-28, 2010, pp. 1-189, Joint Collaborative Team on Video Coding (JCT-VC) of ITU-T SG16 WP3 and ISO/IEC JTC1/SC29/WG11, Geneva, Switzerland.

* cited by examiner

MODE ADAPTIVE INTRA PREDICTION SMOOTHING IN VIDEO CODING

CROSS-REFERENCE TO RELATED APPLICATIONS

This application claims benefit of U.S. Provisional Patent Application Ser. No. 61/422,011, filed Dec. 10, 2010, which is incorporated herein by reference in its entirety.

BACKGROUND OF THE INVENTION

Field of the Invention

Embodiments of the present invention generally relate to mode adaptive intra prediction smoothing in video coding.

Description of the Related Art

Video compression, i.e., video coding, is an essential enabler for digital video products as it enables the storage and transmission of digital video. In general, video compression techniques apply prediction, transformation, quantization, and entropy coding to sequential blocks of pixels in a video sequence to compress, i.e., encode, the video sequence. Video decompression techniques generally perform the inverse of these operations in reverse order to decompress, i.e., decode, a compressed video sequence.

Intra prediction may be carried out by angular prediction from pixels in neighboring blocks. For example, angular intra prediction is proposed in the High Efficiency Video Coding (HEVC) standard currently under development by a Joint Collaborative Team on Video Coding (JCT-VC) established by the ISO/IEC Moving Picture Experts Group (MPEG) and ITU-T Video Coding Experts Group (VCEG). In general, in angular intra prediction, two arrays of reference samples are used are used for angular intra prediction: a reference array corresponding to a row of samples neighboring the block of pixels to be predicted at the top, and a reference array corresponding to a column of samples neighboring the block to the left. Given a dominant prediction direction (horizontal or vertical), one of the reference arrays is defined to be the "main" array and the other array the "side" array.

Figure 1:
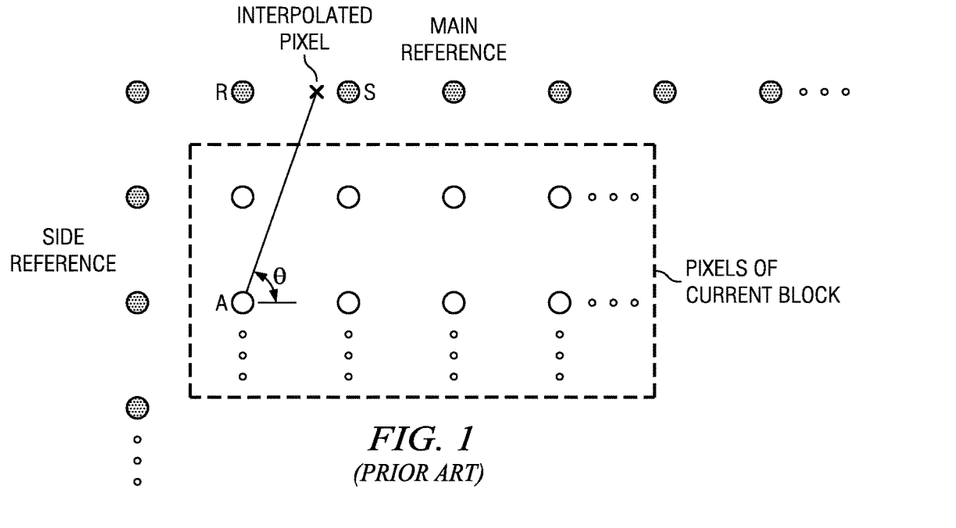
FIG. 1 is an example of angular prediction.

The reference pixel value is determined by drawing a straight line of the prediction angle from a pixel to the reference array. To calculate the prediction pixel value at a fractional pel location in a reference array, bilinear interpolation is used. FIG. 1 shows an example of determining a reference pixel value for a pixel being predicted using angular intra prediction. In this example, $\theta$ is the prediction angle, i.e., the angle of the intra prediction mode. The predicted pixel value for pixel A is calculated by drawing a straight line of the angle $\theta$ from A toward the main reference (or side reference). The predicted value of A is the interpolated value at the intercept of the line and the main (or side) reference, i.e., the predicted value is interpolated from the values of R and S.

There are several different techniques for performing angular intra prediction given the two reference arrays. Some example techniques are described in the following documents: "Test Model under Consideration", JCTVC-B205, Jul. 21-28, 2010; F. Bossen, et al, "Simplified Angular Intra Prediction", JCTVC-B093, Jul. 21-28, 2010; M. Budagavi, "Angular Intra-Prediction and ADI Simplification", JCTVC-B118, Jul. 21-28, 2010; and M. Budagavi, "TE5: TI Evaluation of Unified Intra Prediction Simplifications", JCTVC-C061, Oct. 7-15, 2010. Other examples may be found in other JCTVC documents. Improved prediction may be obtained in some cases if the values of the reference pixels are smoothed, i.e., filtered.

SUMMARY

Embodiments of the present invention relate to methods and apparatus for mode adaptive smoothing of reference pixels in intra prediction. In one aspect, a method for decoding an encoded video bit stream in a video decoder is provided that includes decoding an intra prediction mode for a block of pixels encoded in the video bit stream, determining, based on the intra prediction mode, whether or not a smoothing filter is to be applied to reference pixel values used for intra prediction of the block, applying a smoothing filter to the reference pixel values when a result of the determining is that a smoothing filter is to be applied, and performing intra prediction according to the intra prediction mode using the smoothed reference pixel values to generate a predicted block of pixels.

In one aspect, a video decoder apparatus in a digital system is provided, the decoder apparatus including means for receiving an encoded video bit stream, means for decoding an intra prediction mode for a block of pixels encoded in the video bit stream, means for determining, based on the intra prediction mode, whether or not a smoothing filter is to be applied to reference pixel values used for intra prediction of the block, means for applying a smoothing filter to the reference pixel values when a result of the determining is that a smoothing filter is to be applied, and means for performing intra prediction according to the intra prediction mode using the smoothed reference pixel values to generate a predicted block of pixels.

In one aspect, a method for encoding a digital video stream in a video encoder is provided that includes selecting an intra prediction mode for a block of pixels, determining, based on the intra prediction mode, whether or not a smoothing filter is to be applied to reference pixel values used for intra prediction of the block, applying a smoothing filter to the reference pixel values when a result of the determining is that a smoothing filter is to be applied, and performing intra prediction according to the intra prediction mode using the smoothed reference pixel values to generate a predicted block of pixels.

BRIEF DESCRIPTION OF THE DRAWINGS

Particular embodiments will now be described, by way of example only, and with reference to the accompanying drawings.

DETAILED DESCRIPTION OF EMBODIMENTS OF THE INVENTION

Specific embodiments of the invention will now be described in detail with reference to the accompanying figures. Like elements in the various figures are denoted by like reference numerals for consistency.

As used herein, the term "picture" refers to a frame or a field of a frame. A frame is a complete image captured during a known time interval. For convenience of description, embodiments of the invention are described herein in reference to HEVC. One of ordinary skill in the art will understand that embodiments of the invention are not limited to HEVC. In HEVC, a largest coding unit (LCU) is the base unit used for block-based coding. A picture is divided into non-overlapping LCUs. That is, an LCU plays a similar role in coding as the macroblock of H.264/AVC, but it may be larger, e.g., 32×32, 64×64, etc. An LCU may be partitioned into coding units (CU). A CU is a block of pixels within an LCU and the CUs within an LCU may be of different sizes. The partitioning is a recursive quadtree partitioning. The quadtree is split according to various criteria until a leaf is reached, which is referred to as the coding node or coding unit. The maximum hierarchical depth of the quadtree is determined by the size of the smallest CU (SCU) permitted. The coding node is the root node of two trees, a prediction tree and a transform tree. A prediction tree specifies the position and size of prediction units (PU) for a coding unit. A transform tree specifies the position and size of transform units (TU) for a coding unit. A transform unit may not be larger than a coding unit and the size of a transform unit may be 4×4, 8×8, 16×16, and 32×32. The sizes of the transforms units and prediction units for a CU are determined by the video encoder during prediction based on minimization of rate/distortion costs.

As was previously mentioned, angular intra prediction is currently proposed in HEVC. In the current HEVC test model, intra prediction provides up to 34 directional prediction modes depending on the PU size. For the PU sizes 4×4, 8×8, 16×16, 32×32, 64×64, 17, 34, 34, 34, and 5 prediction modes are respectively provided. The prediction directions may have angles of +/−[0, 2, 5, 9, 13, 17, 21, 26, 32]/32.

Figure 2:
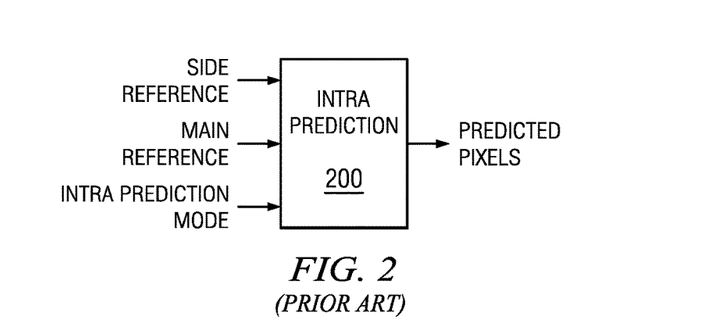
FIGS. 2 and 3 are block diagrams of prior art intra prediction in a video decoder.
Figure 3:
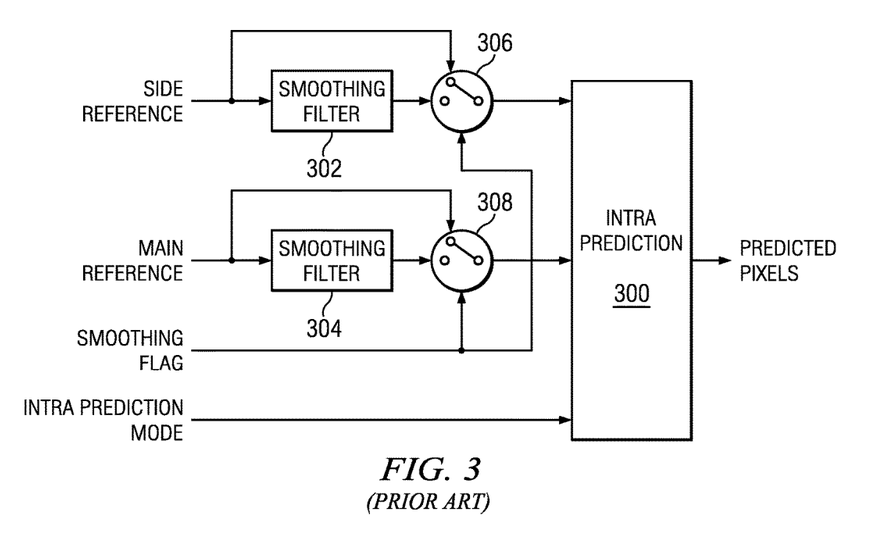

FIGS. 2 and 3 illustrate two prior art approaches for angular intra prediction in a decoder. In FIG. 2, for a given PU, the intra prediction 200 receives side reference pixel values, main reference pixel values, and the intra prediction mode selected by the encoder. The intra prediction 200 then performs angular intra prediction if the intra prediction mode requires angular intra prediction. No smoothing of the reference pixel values is performed.

As was previously mentioned, smoothing the reference pixel values used for angular intra prediction may improve the prediction results. In FIG. 3, for a given PU, a smoothing filter 302, 304 is applied to side reference pixel values and main reference pixel values. A smoothing flag encoded by the encoder in the compressed video bit stream is then used to select 306, 308 whether the smoothed reference values or the unsmoothed reference values are provided to the intra prediction 300. Note that the intra prediction mode selected by the encoder is not used in deciding whether or not smoothed reference values are to be used by intra prediction 300. Instead, the encoder explicitly signals via the smoothing flag whether smoothed or unsmoothed reference values are to be used.

Embodiments of the invention provide for prediction mode adaptive smoothing of reference pixel values used for intra prediction. More specifically, smoothing may be applied to reference pixels used for angular prediction depending on the intra prediction mode, i.e., angle. In some embodiments, the particular filter used for smoothing may also be mode dependent. That is, the same filter is not used for all intra prediction modes. Further, in some embodiments, the decision to apply smoothing may be based on both the intra prediction mode and a smoothing flag. Simulations of the prediction mode adaptive smoothing have shown an average bit rate savings of 0.2% and a maximum bit-rate saving of 0.4%.

Figure 4:
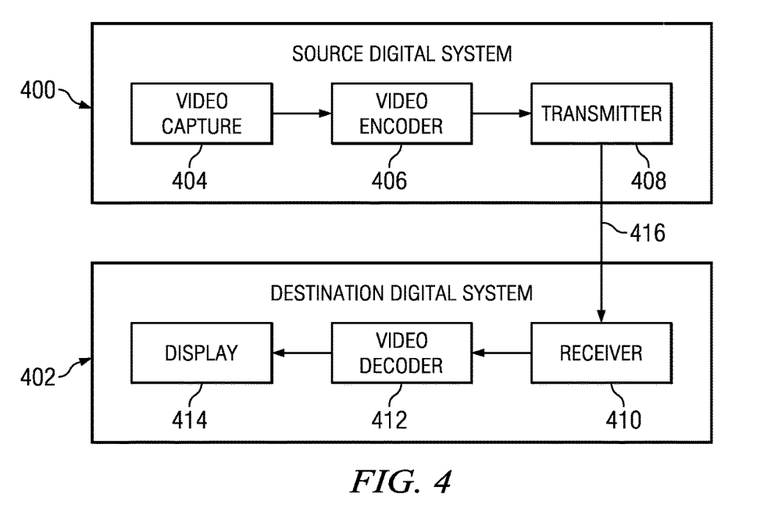
FIG. 4 is a block diagram of a digital system.

FIG. 4 shows a block diagram of a digital system that includes a source digital system 400 that transmits encoded video sequences to a destination digital system 402 via a communication channel 416. The source digital system 400 includes a video capture component 404, a video encoder component 406, and a transmitter component 408. The video capture component 404 is configured to provide a video sequence to be encoded by the video encoder component 406. The video capture component 404 may be, for example, a video camera, a video archive, or a video feed from a video content provider. In some embodiments, the video capture component 404 may generate computer graphics as the video sequence, or a combination of live video, archived video, and/or computer-generated video.

The video encoder component 406 receives a video sequence from the video capture component 404 and encodes it for transmission by the transmitter component 408. The video encoder component 406 receives the video sequence from the video capture component 404 as a sequence of frames, divides the frames into largest coding units (LCUs), and encodes the video data in the LCUs. The video encoder component 406 may be configured to apply mode adaptive reference intra prediction smoothing techniques during the encoding process as described herein. An embodiment of the video encoder component 406 is described in more detail herein in reference to FIG. 5.

The transmitter component 408 transmits the encoded video data to the destination digital system 402 via the communication channel 416. The communication channel 416 may be any communication medium, or combination of communication media suitable for transmission of the encoded video sequence, such as, for example, wired or wireless communication media, a local area network, or a wide area network.

The destination digital system 402 includes a receiver component 410, a video decoder component 412 and a display component 414. The receiver component 410 receives the encoded video data from the source digital system 400 via the communication channel 416 and provides the encoded video data to the video decoder component 412 for decoding. The video decoder component 412 reverses the encoding process performed by the video encoder component 406 to reconstruct the LCUs of the video sequence. The video decoder component 412 may be configured to apply mode adaptive intra prediction smoothing techniques during the decoding process as described herein. An embodiment of the video decoder component 412 is described in more detail below in reference to FIG. 6.

The reconstructed video sequence is displayed on the display component 414. The display component 414 may be any suitable display device such as, for example, a plasma display, a liquid crystal display (LCD), a light emitting diode (LED) display, etc.

In some embodiments, the source digital system 400 may also include a receiver component and a video decoder component and/or the destination digital system 402 may include a transmitter component and a video encoder component for transmission of video sequences both directions for video steaming, video broadcasting, and video telephony. Further, the video encoder component 406 and the video decoder component 412 may perform encoding and decoding in accordance with one or more video compression standards. The video encoder component 406 and the video decoder component 412 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc.

Figure 5:
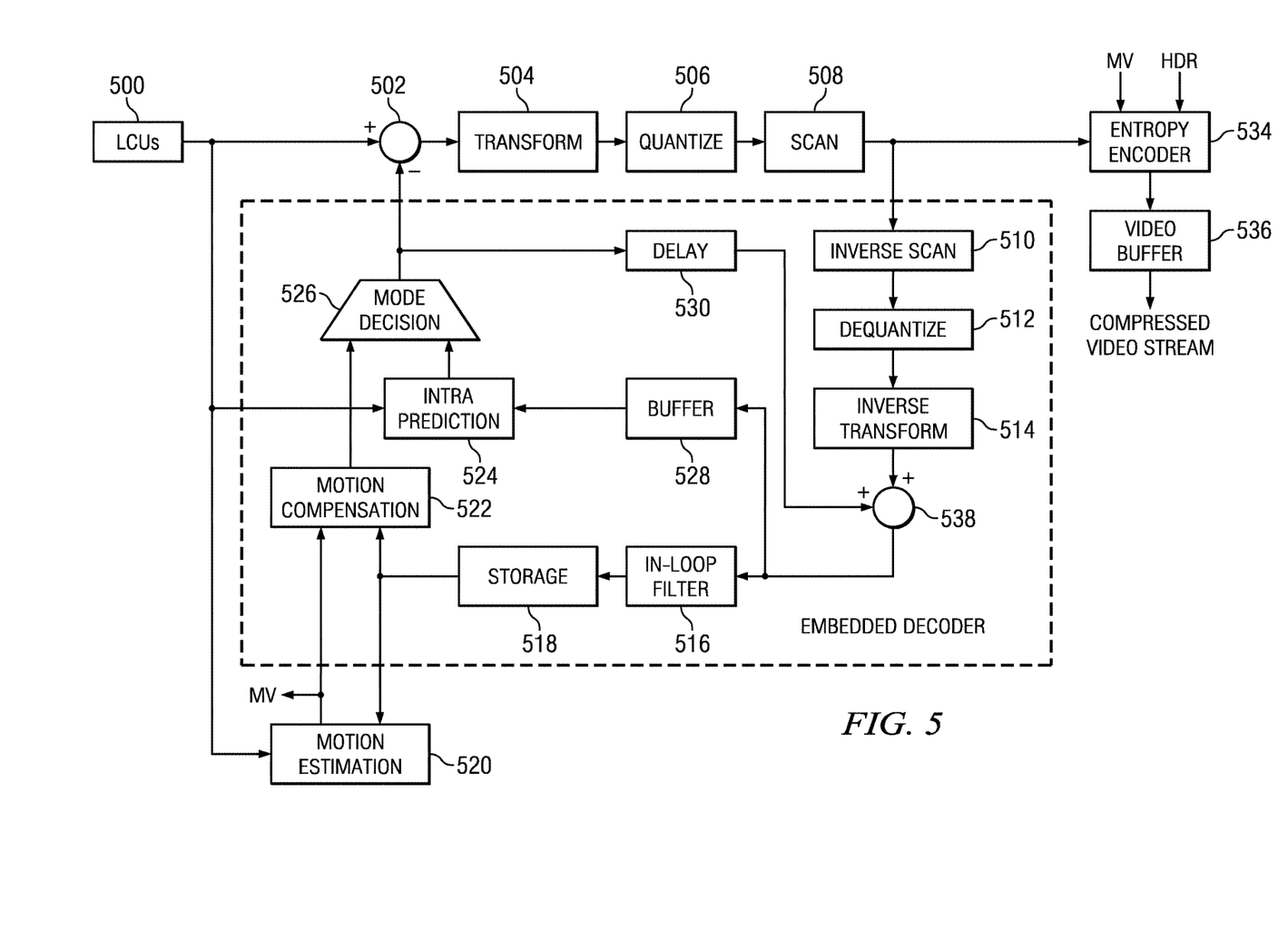
FIG. 5 is a block diagram of a video encoder.

FIG. 5 shows a block diagram of the LCU processing portion of an example video encoder. A coding control component (not shown) sequences the various operations of the LCU processing, i.e., the coding control component runs the main control loop for video encoding. The coding control component receives a digital video sequence and performs any processing on the input video sequence that is to be done at the frame level, such as determining the coding type (I, P, or B) of a picture based on the high level coding structure, e.g., IPPP, IBBP, hierarchical-B, and dividing a frame into LCUs for further processing. The coding control component also may determine the initial LCU CU structure for each CU and provides information regarding this initial LCU CU structure to the various components of the video encoder as needed. The coding control component also may determine the initial PU and TU structure for each CU and provides information regarding this initial structure to the various components of the video encoder as needed.

The LCU processing receives LCUs of the input video sequence from the coding control component and encodes the LCUs under the control of the coding control component to generate the compressed video stream. The CUs in the CU structure of an LCU may be processed by the LCU processing in a depth-first Z-scan order. The LCUs 500 from the coding control unit are provided as one input of a motion estimation component 520, as one input of an intra prediction component 524, and to a positive input of a combiner 502 (e.g., adder or subtractor or the like). Further, although not specifically shown, the prediction mode of each picture as selected by the coding control component is provided to a mode selector component and the entropy encoder 534.

The storage component 518 provides reference data to the motion estimation component 520 and to the motion compensation component 522. The reference data may include one or more previously encoded and decoded CUs, i.e., reconstructed CUs.

The motion estimation component 520 provides motion estimation information to the motion compensation component 522 and the entropy encoder 534. More specifically, the motion estimation component 520 performs tests on CUs in an LCU based on multiple inter prediction modes and transform block sizes using reference data from storage 518 to choose the best motion vector(s)/prediction mode based on a coding cost. To perform the tests, the motion estimation component 520 may begin with the CU structure provided by the coding control component 540. The motion estimation component 520 may divide each CU indicated in the CU structure into PUs according to the unit sizes of prediction modes and into transform units according to the transform block sizes and calculate the coding costs for each prediction mode and transform block size for each CU.

For coding efficiency, the motion estimation component 520 may also decide to alter the CU structure by further partitioning one or more of the CUs in the CU structure. That is, when choosing the best motion vectors/prediction modes, in addition to testing with the initial CU structure, the motion estimation component 520 may also choose to divide the larger CUs in the initial CU structure into smaller CUs (within the limits of the recursive quadtree structure), and calculate coding costs at lower levels in the coding hierarchy. If the motion estimation component 520 changes the initial CU structure, the modified CU structure is communicated to other components in the LCU processing component 542 that need the information.

The motion estimation component 520 provides the selected motion vector (MV) or vectors and the selected prediction mode for each inter predicted PU of a CU to the motion compensation component 523 and the selected motion vector (MV) to the entropy encoder 534. The motion compensation component 522 provides motion compensated inter prediction information to the mode decision component 526 that includes motion compensated inter predicted PUs, the selected inter prediction modes for the inter predicted PUs, and corresponding transform block sizes. The coding costs of the inter predicted PUs are also provided to the mode decision component 526.

The intra prediction component 524 provides intra prediction information to the mode decision component 526 that includes intra predicted PUs and the corresponding intra prediction modes. That is, the intra prediction component 524 performs intra prediction in which tests based on multiple intra prediction modes and transform unit sizes are performed on CUs in an LCU using previously encoded neighboring PUs from the buffer 528 to choose the best intra prediction mode for each PU in the CU based on a coding cost. The intra prediction modes may include directional prediction modes in which angular prediction is used. Further, a smoothing filter may be associated with at least some of the directional prediction modes. For example, the video coding standard may specify which of the modes is to use a smoothing filter. In some embodiments, the smoothing filter is the same for all prediction modes for which smoothing is to be applied. The particular video coding standard may specify what that filter is, e.g., a [1 2 1] filter. In some embodiments, more than one smoothing filter may be used. That is, the same smoothing filter is not used for all prediction modes for which smoothing is to be applied. Rather, different smoothing filters may be used for different modes. For example, the video coding standard may define three different smoothing filters, e.g., [1 2 1], [1 1 4 1 1], and [1], and specify which of these three filters is to be used for each of the prediction modes for which smoothing is to be applied.

To perform the tests, the intra prediction component 524 may begin with the CU structure provided by the coding control component 540. The intra prediction component 524 may divide each CU indicated in the CU structure into PUs according to the unit sizes of the intra prediction modes and into transform units according to the transform block sizes and calculate the coding costs for each prediction mode and transform block size for each PU. For those intra prediction modes in which smoothing is to be applied, the intra prediction component 524 will apply the smoothing filter to the main and side reference values. In some embodiments, application of the smoothing filter may be optional. In such embodiments, the intra prediction component 524 may test a mode both with and without the smoothing filter. If an intra prediction mode with an associated filter is ultimately selected and the smoothing filter was not applied, an indication that the smoothing filter was not used for the mode, e.g., a smoothing flag, is encoded to indicate to the decoder that the smoothing filter is not to be applied.

For coding efficiency, the intra prediction component 524 may also decide to alter the CU structure by further partitioning one or more of the CUs in the CU structure. That is, when choosing the best prediction modes, in addition to testing with the initial CU structure, the intra prediction component 524 may also chose to divide the larger CUs in the initial CU structure into smaller CUs (within the limits of the recursive quadtree structure), and calculate coding costs at lower levels in the coding hierarchy. If the intra prediction component 524 changes the initial CU structure, the modified CU structure is communicated to other components in the LCU processing component 542 that need the information. Further, the coding costs of the intra predicted PUs and the associated transform block sizes are also provided to the mode decision component 526.

The mode decision component 526 selects between the motion-compensated inter predicted PUs from the motion compensation component 522 and the intra predicted PUs from the intra prediction component 524 based on the coding costs of the PUs and the picture prediction mode provided by the mode selector component. The output of the mode decision component 526, i.e., the predicted PU, is provided to a negative input of the combiner 502 and to a delay component 530. The associated transform block size is also provided to the transform component 504. The output of the delay component 530 is provided to another combiner (i.e., an adder) 538. The combiner 502 subtracts the predicted PU from the current PU to provide a residual PU to the transform component 504. The resulting residual PU is a set of pixel difference values that quantify differences between pixel values of the original PU and the predicted PU.

The transform component 504 performs block transforms on the residual PUs to convert the residual pixel values to transform coefficients and provides the transform coefficients to a quantize component 506. The transform component 504 receives the transform block sizes for the residual PUs and applies transforms of the specified sizes to the PUs to generate transform coefficients.

The quantize component 506 quantizes the transform coefficients based on quantization parameters (QPs) and quantization matrices provided by the coding control component and the transform sizes. The quantized transform coefficients are taken out of their scan ordering by a scan component 508 and arranged by significance, such as, for example, beginning with the more significant coefficients followed by the less significant.

The ordered quantized transform coefficients for a PU provided via the scan component 508 along with header information for the PU are coded by the entropy encoder 534, which provides a compressed bit stream to a video buffer 536 for transmission or storage. The header information may include the prediction mode used for the PU. In some embodiments, the header information may also include an indication as to whether or not smoothing was applied for the prediction mode. The entropy encoder 534 also codes the CU structure of each LCU.

The LCU processing includes an embedded decoder. As any compliant decoder is expected to reconstruct an image from a compressed bit stream, the embedded decoder provides the same utility to the video encoder. Knowledge of the reconstructed input allows the video encoder to transmit the appropriate residual energy to compose subsequent frames. To determine the reconstructed input, i.e., reference data, the ordered quantized transform coefficients for a CU provided via the scan component 508 are returned to their original post-transform arrangement by an inverse scan component 510, the output of which is provided to a dequantize component 512, which outputs a reconstructed version of the transform result from the transform component 504.

The dequantized transform coefficients are provided to the inverse transform component 514, which outputs estimated residual information which represents a reconstructed version of a residual PU. The inverse transform component 514 receives the transform block size used to generate the transform coefficients and applies inverse transform(s) of the specified size to the transform coefficients to reconstruct the residual values.

The reconstructed residual PU is provided to the combiner 538. The combiner 538 adds the delayed selected PU to the reconstructed residual PU to generate an unfiltered reconstructed PU, which becomes part of reconstructed picture information. The reconstructed picture information is provided via a buffer 528 to the intra prediction component 524 and to a filter component 516. The filter component 516 is an in-loop filter which filters the reconstructed frame information and provides filtered reconstructed PUs, i.e., reference data, to the storage component 518.

Figure 6:
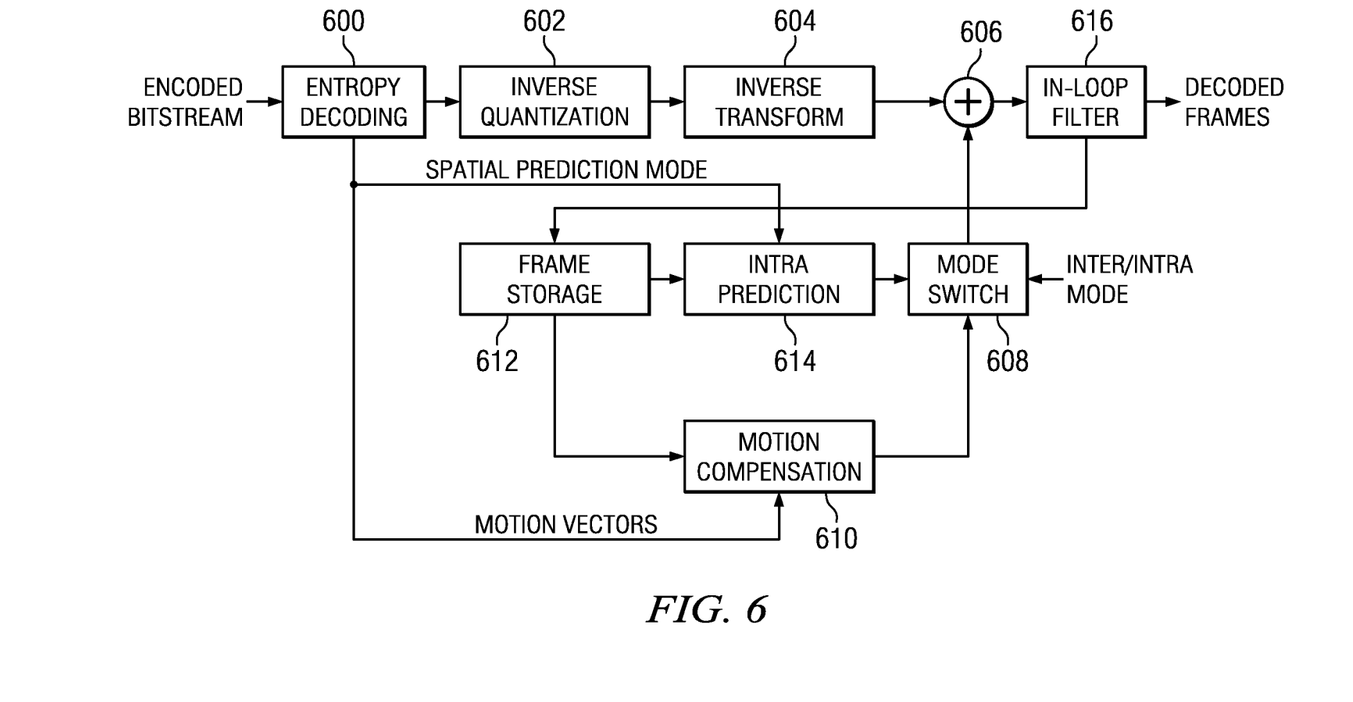
FIG. 6 is a block diagram of a video decoder.

FIG. 6 shows a block diagram of an example video decoder. The video decoder operates to reverse the encoding operations, i.e., entropy coding, quantization, transformation, and prediction, performed by the video encoder of FIG. 5 to regenerate the frames of the original video sequence. In view of the above description of a video encoder, one of ordinary skill in the art will understand the functionality of components of the video decoder without detailed explanation.

The entropy decoding component 600 receives an entropy encoded (compressed) video bit stream and reverses the entropy coding to recover the encoded PUs and header information such as the prediction modes, smoothing flags (in some embodiments), and the encoded CU structures of the LCUs. The inverse quantization component 602 dequantizes the quantized transform coefficients of the residual PUs. The inverse transform component 604 transforms the frequency domain data from the inverse quantization component 602 back to residual PUs. That is, the inverse transform component 604 applies an inverse unit transform, i.e., the inverse of the unit transform used for encoding, to the de-quantized residual coefficients to produce the residual PUs.

A residual PU supplies one input of the addition component 606. The other input of the addition component 606 comes from the mode switch 608. When an inter-prediction mode is signaled in the encoded video stream, the mode switch 608 selects a PU from the motion compensation component 610 and when an intra-prediction mode is signaled, the mode switch selects a PU from the intra prediction component 614. The motion compensation component 610 receives reference data from storage 612 and applies the motion compensation computed by the encoder and transmitted in the encoded video bit stream to the reference data to generate a predicted PU.

The intra prediction component 614 receives reference data from previously decoded PUs of a current picture from the frame storage and applies the intra prediction computed by the encoder as signaled by the intra prediction mode transmitted in the encoded video bit stream to the reference data to generate a predicted PU. If the intra prediction mode uses angular prediction, and a smoothing filter is associated with the intra prediction mode, the smoothing filter is applied to the main and side reference pixel values before the pixel values are used for intra prediction. In embodiments where application of a smoothing filter is optional, the smoothing flag for the current PU is checked and the associated smoothing filter is applied only if the smoothing flag indicates that the smoothing filter was used in the encoder.

Referring again to FIG. 6, the addition component 606 generates a decoded PU, by adding the selected predicted PU and the residual PU. The output of the addition component 606 supplies the input of the in-loop filter component 616. The in-loop filter component 616 smoothes artifacts created by the block nature of the encoding process to improve the visual quality of the decoded frame. The output of the in-loop filter component 616 is the decoded frames of the video bit stream. Each decoded PU is stored in storage 612 to be used as reference data.

Figure 7:
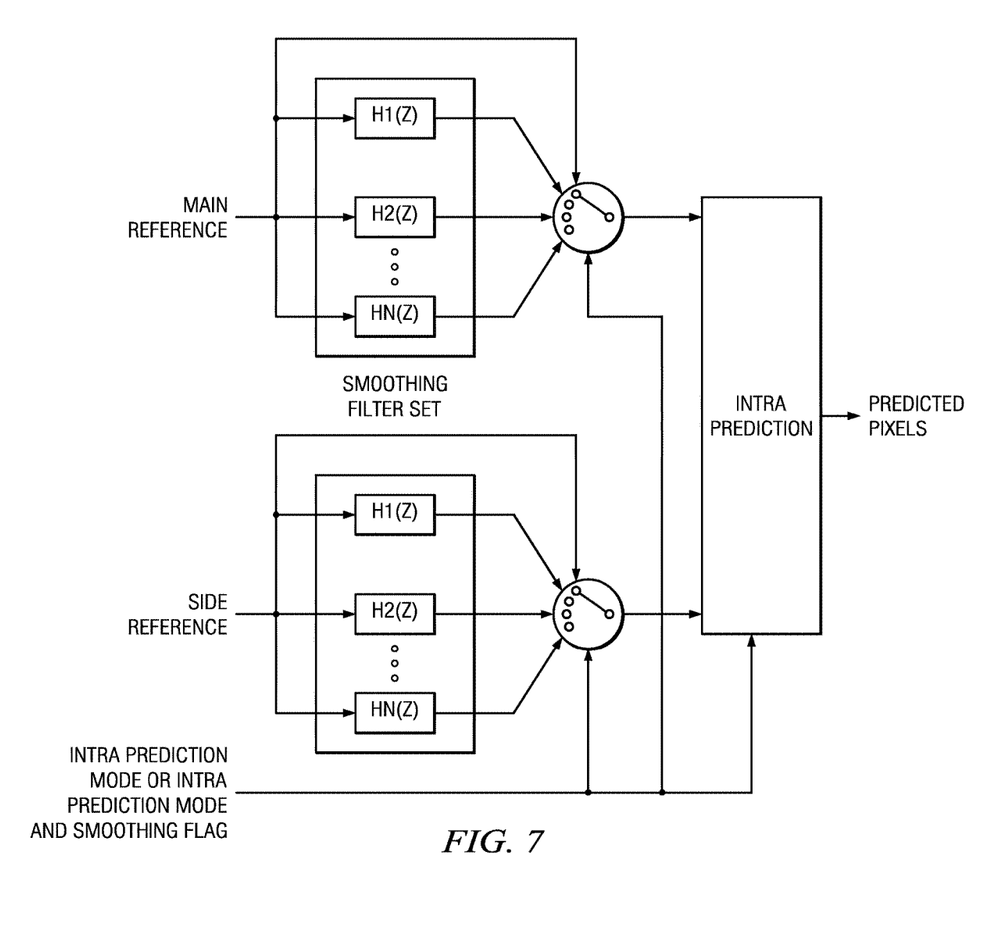
FIG. 7 is a conceptual illustration of mode adaptive intra prediction smoothing in a video decoder.

FIG. 7 is a conceptual illustration of mode adaptive intra prediction smoothing in a video decoder. A smoothing filter may be selected from a set of smoothing filters or no filter may be selected based on the intra prediction mode for a block of pixels signaled by the encoder. If a smoothing filter is selected, the filter is applied to the reference pixel values before they are used for intra prediction. Otherwise, the original reference pixel values are used for intra prediction. The same smoothing filter, if any, is applied to both side reference pixels and main reference pixels. The intra prediction uses the smoothed or original reference pixel values perform intra prediction according to the signaled intra prediction mode. Although multiple smoothing figures are shown in the figure, there may be only one smoothing filter in the set of smoothing filters. The number of smoothing filters in the set depends on the number of smoothing filters defined by the video coding standard in use. Further, which smoothing filter, if any, that is to be used for a particular intra prediction mode, is also defined by the video coding standard in use.

In some embodiments, the application of smoothing filters may be optional. In such embodiments, a smoothing flag may be signaled by the encoder to indicate whether or not smoothed reference pixel values are to be used. In such embodiments, the smoothing flag may be used to override the application of the smoothing filter.

Figure 8:
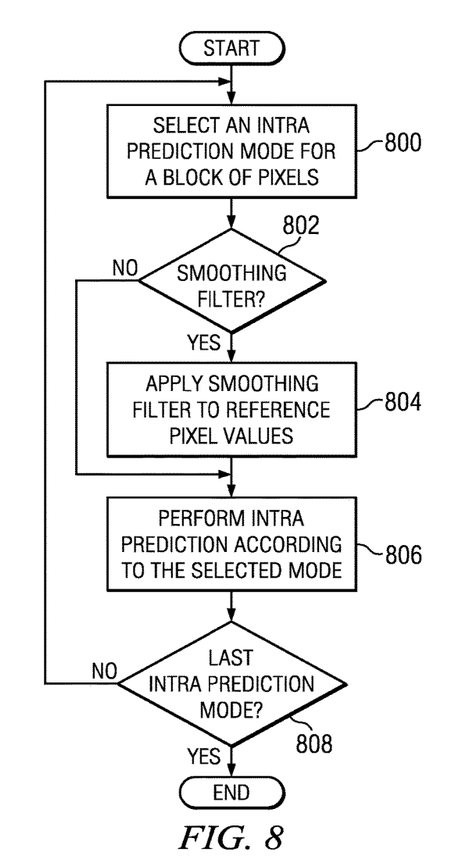
FIGS. 8 and 9 are flow diagrams of methods for mode adaptive intra prediction smoothing.

FIG. 8 shows a flow diagram of a method for mode adaptive intra prediction smoothing in a video encoder. As was previously explained, in general, for intra prediction of a block of pixels, different intra prediction modes are applied, the cost of each mode is determined, and the mode yielding the best result is selected as the intra prediction mode for the block. The method of FIG. 8 illustrates mode adaptive intra prediction smoothing for intra prediction of one block.

Initially, one of the intra prediction modes is selected 800. Based on the selected intra prediction mode, a determination 802 is made as to whether or not a smoothing filter is to be applied to reference pixel values used for this particular mode. As was previously explained, the video standard in use may designate smoothing filter use for some directional intra prediction modes and not for others. Further, the video standard may define just a single smoothing filter that is used for all directional intra prediction modes that are to use smoothed reference pixel values or may define several smoothing filters and designate which smoothing filter, if any, is to be used by each mode. If a smoothing filter is to be applied, and multiple smoothing filters are available, the particular smoothing filter to be used is selected based on the intra prediction mode.

If a smoothing filter is to be used 802, the smoothing filter is applied to the reference pixel values 804 to be used for intra prediction. Otherwise, the original reference pixel values are used. Intra prediction 806 is then performed according to the selected mode using the original or smoothed reference pixel values. If all intra prediction modes for the block have not been tried 808, the process is repeated.

While not specifically shown in FIG. 8, in some embodiments, application of the smoothing filter may be optional. In such embodiments, a smoothing flag is set to indicate to the decoder whether or not smoothing is to be applied. If a smoothing filter is defined for an intra prediction mode, the intra prediction is performed with both the smoothed and the original reference pixel values. If a better result is achieved using the original reference pixel values and the intra prediction mode is selected as the prediction mode for encoding the block, the smoothing flag is set to indicate to the decoder that the smoothing filter defined for the mode is not to be used. Otherwise, the flag is set to indicate use of the smoothing filter.

Figure 9:
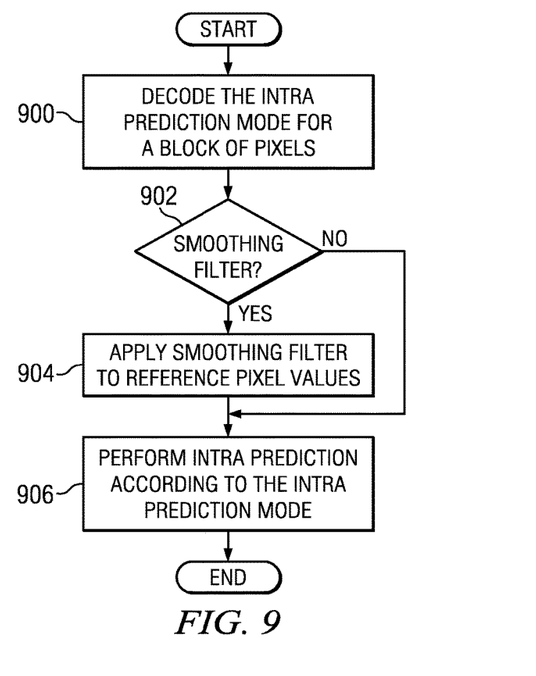

FIG. 9 shows a flow diagram of a method for mode adaptive intra prediction smoothing in a video decoder. Initially, the intra prediction mode for a block of pixels encoded in a compressed video bit stream is decoded 900. Based on this intra prediction mode, a determination 902 is made as to whether or not a smoothing filter is to be applied to reference pixel values used for this particular mode. As was previously explained, the video standard in use may designate smoothing filter use for some directional intra prediction modes and not for others. Further, the video standard may define just a single smoothing filter that is used for all directional intra prediction modes that are to use smoothed reference pixel values or may define several smoothing filters and designate which smoothing filter, if any, is to be used by each mode. If a smoothing filter is to be applied, and multiple smoothing filters are available, the particular smoothing filter to be used is selected based on the intra prediction mode.

If a smoothing filter is to be used 902, the smoothing filter is applied 904 to the reference pixel values to be used for intra prediction. Otherwise, the original reference pixel values are used. Intra prediction 906 is then performed according to the decoded intra prediction mode using the original or smoothed reference pixel values.

While not specifically shown in FIG. 9, in some embodiments, application of the smoothing filter may be optional. In such embodiments, a smoothing flag is encoded in the compressed bit stream to indicate to the decoder whether or not smoothing is to be applied. The determination 902 as to whether or not a smoothing filter is to be applied to reference pixel values used for the intra prediction mode is based on both the intra prediction mode and the value of the smoothing flag.

Figure 10:
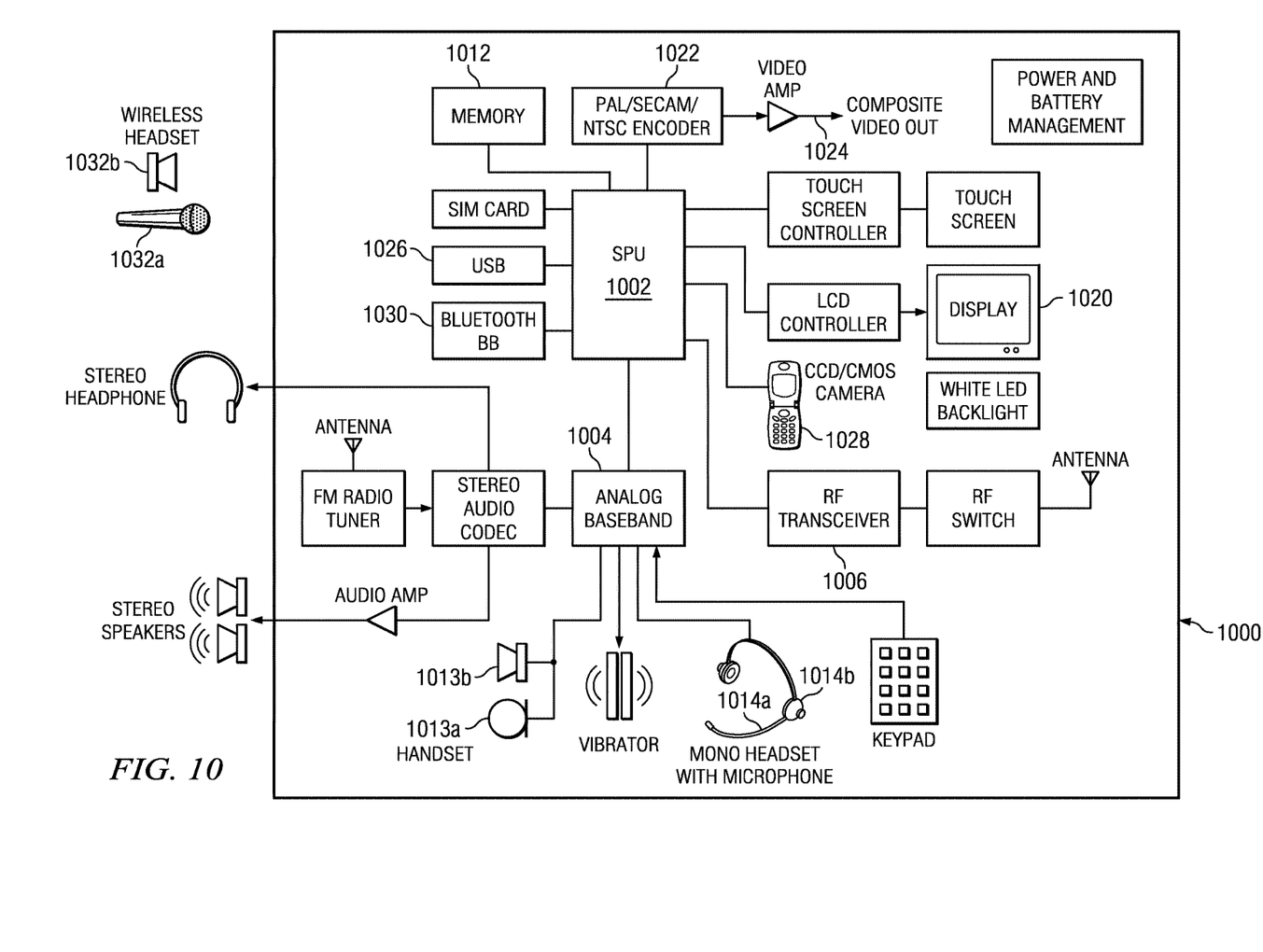
FIG. 10 is a block diagram of an illustrative digital system.

Embodiments of the methods, encoders, and decoders described herein may be implemented for virtually any type of digital system (e.g., a desk top computer, a laptop computer, a handheld device such as a mobile (i.e., cellular) phone, a personal digital assistant, a digital camera, etc.). FIG. 10 is a block diagram of a digital system 1000 (e.g., a mobile cellular telephone) that may be configured to use techniques described herein.

As shown in FIG. 10, the signal processing unit (SPU) 1002 includes a digital signal processing system (DSP) that includes embedded memory and security features. The analog baseband unit 1004 receives a voice data stream from the handset microphone 1013a and sends a voice data stream to the handset mono speaker 1013b. The analog baseband unit 1004 also receives a voice data stream from the microphone 1014a or 1032a and sends a voice data stream to the mono headset 1014b or wireless headset 1032b. The analog baseband unit 1004 and the SPU 1002 may be separate ICs. In many embodiments, the analog baseband unit 1004 does not embed a programmable processor core, but performs processing based on configuration of audio paths, filters, gains, etc being setup by software running on the SPU 1002.

The display 1020 may display pictures and video sequences received from a local camera 1028, or from other sources such as the USB 1026 or the memory 1012. The SPU 1002 may also send a video sequence to the display 1020 that is received from various sources such as the cellular network via the RF transceiver 1006 or the Bluetooth interface 1030. The SPU 1002 may also send a video sequence to an external video display unit via the encoder unit 1022 over a composite output terminal 1024. The encoder unit 1022 may provide encoding according to PAL/SECAM/NTSC video standards.

The SPU 1002 includes functionality to perform the computational operations required for video encoding and decoding. In one or more embodiments, the SPU 1002 is configured to perform computational operations for applying one or more techniques for mode adaptive intra prediction smoothing during the encoding process as described herein. Software instructions implementing all or part of the techniques may be stored in the memory 1012 and executed by the SPU 1002, for example, as part of encoding video sequences captured by the local camera 1028. The SPU 1002 is also configured to perform computational operations for applying one or more techniques for quantization mode adaptive intra prediction smoothing as described herein as part of decoding a received coded video sequence or decoding a coded video sequence stored in the memory 1012. Software instructions implementing all or part of the techniques may be stored in the memory 1012 and executed by the SPU 1002.

Other Embodiments

While the invention has been described with respect to a limited number of embodiments, those skilled in the art, having benefit of this disclosure, will appreciate that other embodiments can be devised which do not depart from the scope of the invention as disclosed herein.

Embodiments of the methods, encoders, and decoders described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

It is therefore contemplated that the appended claims will cover any such modifications of the embodiments as fall within the true scope of the invention.

What is claimed is:

1. A method for decoding an encoded video bit stream in a video decoder, the method comprising:
    decoding an intra prediction mode for a block of pixels encoded in the video bit stream;
    determining, based on the intra prediction mode, whether or not a smoothing filter is to be applied to reference pixel values used for intra prediction of the block;
    selecting a smoothing filter to be applied to the reference pixel values from a plurality of smoothing filters based on the intra prediction mode in response to determining that the smoothing filter is to be applied;
    applying the selected smoothing filter to the reference pixel values to generate smoothed reference pixel values in response to determining that the smoothing filter is to be applied; and
    performing intra prediction according to the intra prediction mode using the smoothed reference pixel values to generate a predicted block of pixels.

2. The method of claim 1, wherein the determining is further based on a smoothing flag encoded in the video bit stream.

3. The method of claim 1, wherein the smoothing filter consists of a [1 2 1] filter, a [1 1 4 1 1] filter, and a [1] filter.

* * * * *